United States Patent
Kim et al.

(10) Patent No.: US 7,389,036 B2
(45) Date of Patent: Jun. 17, 2008

(54) A/V DATA RECORDING/REPRODUCING APPARATUS AND METHOD FOR SELECTING STORED FILE LIST THEREOF

(75) Inventors: Jong-Phil Kim, Suwon-si (KR); Ju-Yup Lee, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 638 days.

(21) Appl. No.: 10/983,669

(22) Filed: Nov. 9, 2004

(65) Prior Publication Data

US 2006/0098947 A1 May 11, 2006

(51) Int. Cl.
*H04N 5/91* (2006.01)

(52) U.S. Cl. .................. 386/46; 369/30.08

(58) Field of Classification Search .. 369/30.08–30.12; 386/46, 55, 69; 709/217–219, 224, 246, 709/203, 206; 345/156, 204; 715/243, 251, 715/255, 273
See application file for complete search history.

(56) References Cited

U.S. PATENT DOCUMENTS

| | | | |
|---|---|---|---|
| 6,255,961 B1 * | 7/2001 | Van Ryzin et al. | 340/825.25 |
| 6,356,971 B1 * | 3/2002 | Katz et al. | 710/301 |
| 6,700,839 B1 * | 3/2004 | Auflick et al. | 369/30.08 |
| 7,130,616 B2 * | 10/2006 | Janik | 455/412.1 |

* cited by examiner

*Primary Examiner*—Thai Q Tran
*Assistant Examiner*—Mishawn Dunn
(74) *Attorney, Agent, or Firm*—Roylance, Abrams, Berdo & Goodman, LLP

(57) ABSTRACT

The present invention lists and displays file information for each folder when reproducing video/audio files stored to a recording medium, performs a grouping for entire files on a folder for each folder according to a maximum number of files possibly displayed on one screen, performs a page numbering sequentially for the files for each group, then displays the files on a screen in a page unit for which a grouping has been performed upon a playlist display request. Therefore, a user can reach a desired file to manage in an easy and swift manner.

15 Claims, 12 Drawing Sheets

A/V DATA RECORDING/REPRODUCING APPARATUS AND METHOD FOR SELECTING STORED FILE LIST THEREOF

BACKGROUND OF THE INVENTION

1. Field of the Invention

The present invention relates to a method for displaying a file list stored in an audio/video (A/V) recording/reproducing apparatus. More particularly, the presents invention relates to an A/V recording/reproducing apparatus and a method for displaying a file list and capable of displaying a playlist of files. The files are stored in a memory unit or a folder of a recording medium where music and photos are stored, and accessing a desired file from the displayed playlist of the files can be accomplished in a fast and swift manner.

2. Description of the Related Art

With the development of digitalization and compression technologies for broadcast signals, A/V data recording/reproducing apparatuses are now capable of recording/reproducing the broadcast signals to and from a recording medium, thereby increasing the functionality of such apparatuses. Newly introduced and marketed A/V recording/reproducing apparatuses are provided in the form of a combination device wherein a first device and a second device respectively performing independent functions are incorporated into one single unit. The single unit has the function of recording/reproducing an A/V signal.

Recently introduced combination-type A/V data recording/reproducing apparatus also incorporate a digital video disk (DVD) player (a first device), and a hard disk drive (HDD; second device) into one housing. Presently and soon to be available A/V recording/reproducing apparatuses are being developed to support the use of various video sources, such as a satellite broadcasting signal, a cable broadcasting signal, and network broadcasting through the Internet.

The HDD in the combination-type A/V data recording/reproducing apparatus supports random access, which is a method for directly accessing desired data using an address, and supports high speed in its data transmission and large capacity recording performance. Thus, the HDD is currently used for an A/V data recording apparatus.

A/V data can be generally divided into three types: moving picture data, still image data, and audio data. Each type of data is recorded in the form of a computer file on a physically subdivided region of a HDD, and is displayed as a list on a screen.

In the conventional A/V data recording/reproducing apparatus described above, however, a playlist recorded on a HDD may store an enormous amount of files due to nearly continuous increases in their storage capacity. When users want to find a desired file, they usually want to find the file with simple key operations. Only a predetermined number of files are displayed on one screen at a time, it is inevitable that the files are divided and displayed using a predetermined number of pages in order to display the numerous files. Accordingly, it is desirable to provide a function for dividing the files and pages so that a user can easily select a desired file.

SUMMARY OF THE INVENTION

An aspect of the present invention is to solve at least the above problems and/or disadvantages and to provide at least the advantages described below. Accordingly, an aspect of the present invention is to provide an A/V recording/reproducing apparatus and a method for selecting a file list thereof, in which a user can easily and swiftly reach a file to be managed on a playlist of files recorded on a memory unit and/or a recording medium.

In order to achieve the above-described aspects of the present invention, there is provided an A/V recording/reproducing apparatus for recording an A/V signal received from external sources in a memory unit, a parent folder for recording a still image file and/or an audio file, and/or at least one sub-folder included in the parent folder of the memory unit. For reproducing the recorded A/V signal and outputting the A/V signal to an external display unit, the A/V recording/reproducing apparatus comprises a recording medium playback unit for playing an A/V file from a recording medium onto which an A/V signal has been recorded, an interface installed on a main body for receiving a user's input signal from an external input unit with which functions supported by the A/V recording/reproducing apparatus can be selected, and a main controller for listing each file information stored in the memory unit and/or the recording medium for each folder and displaying the information if a playlist screen display request signal regarding files stored in the memory unit and/or the recording medium is received from the external input unit. The main controller can perform grouping, for each folder, with respect to all the files included in a folder according to a maximum number of files that can be displayed on one screen. The main controller can further performing sequential page numbering for each group, and display the files for each grouped page on a screen upon a request to display the playlist. The main controller can also display a previous/next page of a currently displayed page on a screen if a page up/down signal is received from the external input unit, and the main controller can select/display an uppermost file on a first page and a last file on a last page if an uppermost file/last file selection signal is received from the external input unit.

The page up/down signal and the uppermost file/last file selection signal can be generated by pressing a fast forward/rewind (FF/REW) key and a LEFT/RIGHT key.

An apparatus according to an embodiment of the present invention can also display a description of the keys on a lower end of a playlist screen so that a user can select and use a relevant key function with greater ease.

In another aspect of the present invention, there is provided a method for displaying a file list in an A/V recording/reproducing apparatus for recording an A/V signal received from an outside in a memory unit, the A/V recording/reproducing apparatus comprising a parent folder for recording a moving picture file, a still image file and/or an audio file, and/or at least one sub-folder included in the parent folder of the memory unit, and/or a recording medium for reproducing the A/V signal recorded in the memory unit and/or the recording medium, and outputting the video signal to an external display unit, the method including the steps of performing a grouping in units of a predetermined number of files for entire files included in a folder that have been stored in the recording medium and/or the memory unit, performing a page numbering sequentially for each aforementioned group and displaying the files for each numbered page on the display unit if a playlist display request signal for the files is received. The method according to an embodiment of the present invention further comprises displaying a previous/next page of a currently displayed page on a screen if a page up/down signal is received with a playlist of the files displayed,; and selecting an uppermost file on a first page and a last file on a last page and displaying the files on the display unit if an uppermost file/last file selection signal is received.

In accordance with another embodiment of the present invention, the step of performing the grouping entire files in the folder can be performed according to a maximum number of files that can be displayed on one screen.

BRIEF DESCRIPTION OF THE DRAWINGS

The invention will be described in detail with reference to the following drawings in which like reference numerals refer to like elements, and wherein.

DETAILED DESCRIPTION OF THE EXEMPLARY EMBODIMENTS

Figure 1:
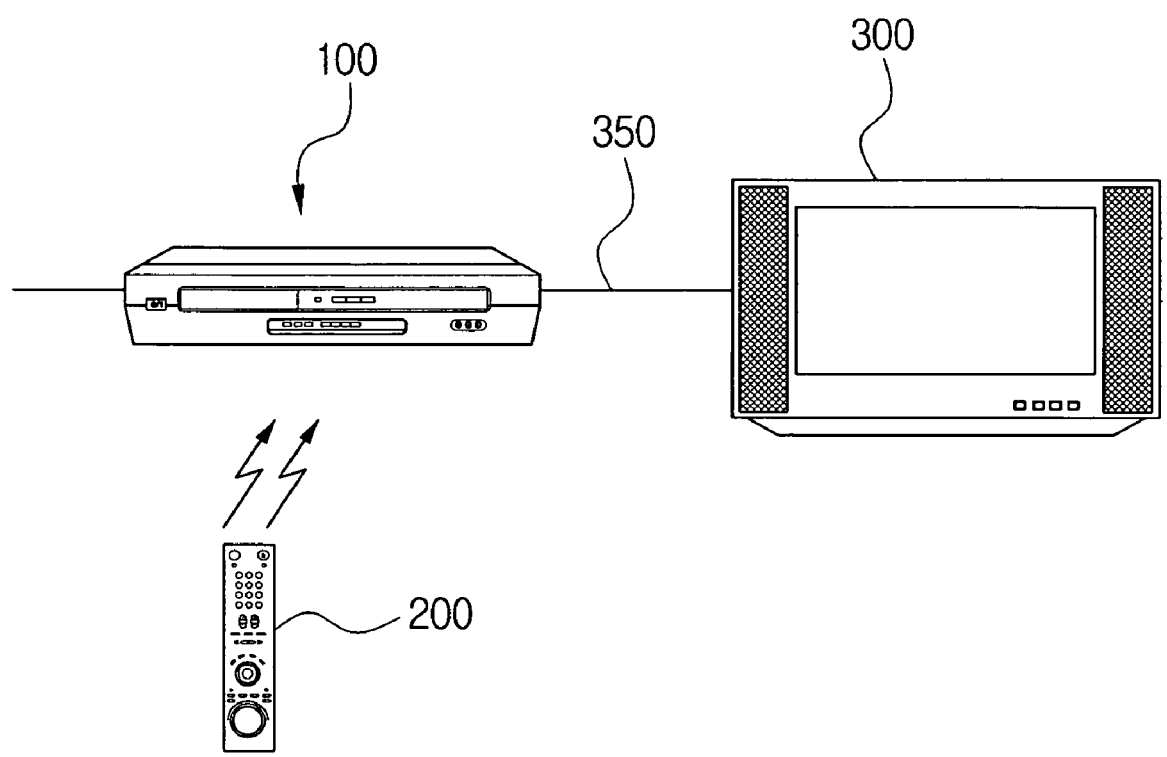
FIG. 1 is a view illustrating a display system adopting an A/V recording/reproducing apparatus according to an embodiment of the present invention.

Certain embodiments of the present invention will now be described in greater detail with reference to the accompanying drawings.

In the following description, the same drawing reference numerals are used for the same elements even in different drawings. The matters defined in the description such as a detailed construction and elements are provided to assist in a comprehensive understanding of the invention. Thus, it is apparent to those skilled in the art of the present invention that the present invention can be carried out without those defined matters. Furthermore, well-known functions or constructions of an optical pickup unit of a general optical disc drive, as described in the related art, will not be described in detail for purposes of conciseness.

FIG. 1 is a view illustrating a display system adopting an A/V recording/reproducing apparatus according to an embodiment of the present invention.

Referring to FIG. 1, an A/V recording/reproducing apparatus 100 is connected with a television 300, which is a display unit, via a transmission cable 350.

The A/V recording/reproducing apparatus 100 processes a signal received from a remote controller 200 that is an external input unit, and transmits display information to the television 300. Other input units, such as a wired-type keyboard or a remote controller 200 for transmitting a radio signal (using infrared or other wireless technologies) can be used for the external input unit.

The A/V recording/reproducing apparatus 100 is configured to receive one or more video signals provided from a plurality of video sources. For example, the video source can include other medium capable of transmitting a signal, such as television broadcasting of a ground wave, a satellite broadcast, a CATV transmission, and a signal received from a computer or modem line. The embodiments of the present invention can be applied to an A/V recording/reproducing apparatus configured to receive one or more video signals from a plurality of video sources such as a cable, a satellite dish, a local cable TV provider, a digital broadcast source (DBS), a general antenna, the Internet, other computer sources, a camcorder, a disk player, a set-top box, among other types.

The A/V recording/reproducing apparatus 100 has a large capacity memory unit in order to store the video/audio data. According to an embodiment of the present invention, a HDD can be used for the large capacity memory unit.

Figure 2:
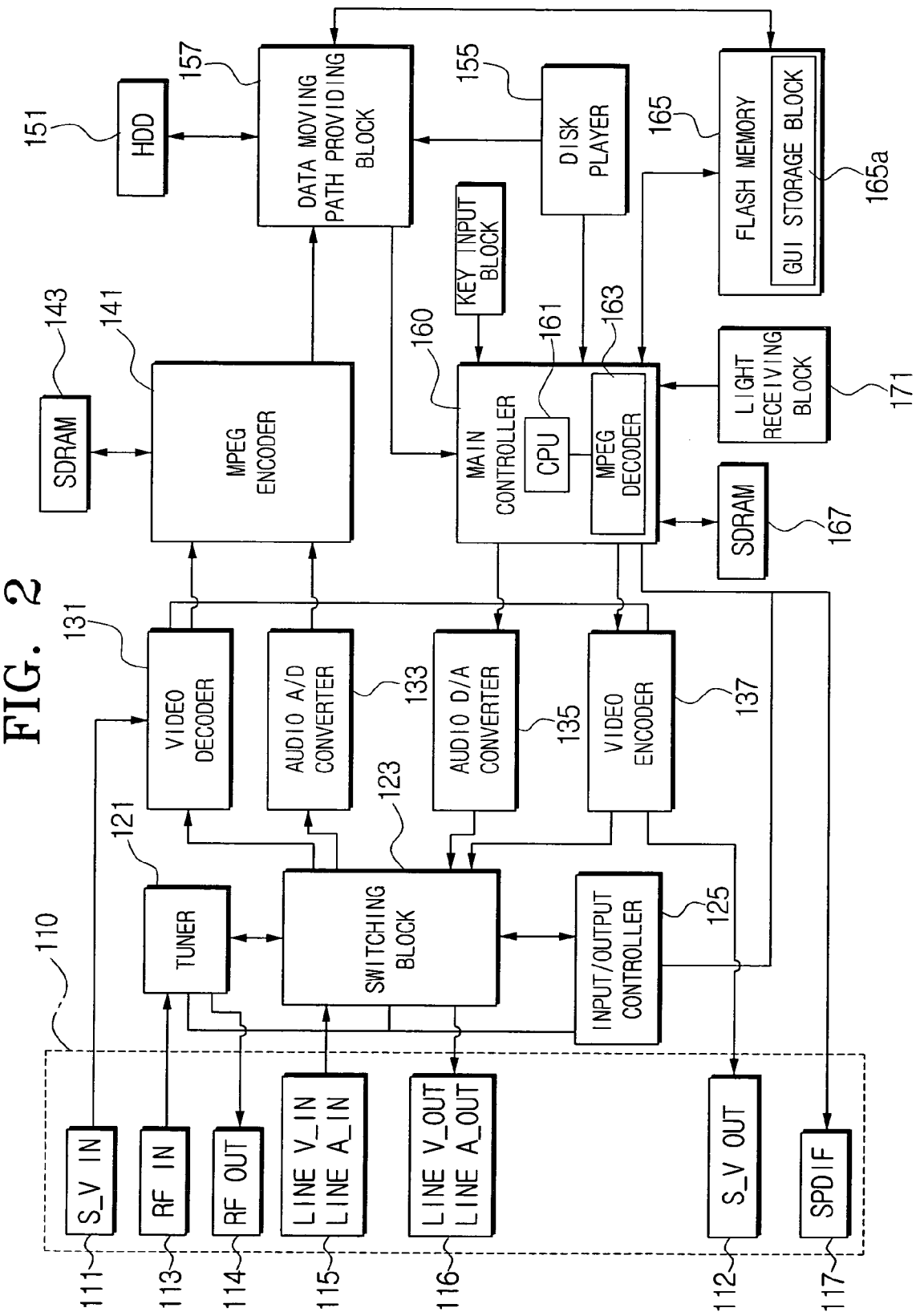
FIG. 2 is a block diagram of the A/V recording/reproducing apparatus illustrated in FIG. 1.

FIG. 2 is a block diagram of the A/V recording/reproducing apparatus illustrated in FIG. 1 according to an embodiment of the present invention. Referring to FIG. 2, the A/V recording/reproducing apparatus 100 comprises an input/output terminal 110, a tuner 121, a switching block 123, an input/output controller 125, an moving picture experts group (MPEG) encoder 141, an HDD 151, a disk player 155, and a main controller 160.

The input/output terminal 110 receives a signal generated from various video signal sources and outputs the received signal, or outputs a signal input from the HDD 151 adopted as a large capacity memory unit.

The input/output terminal 110 comprises a super video terminal (S_V IN) 111, an super video output terminal (S_V OUT) 112, an RF input terminal (RF IN) 113 and a RF output terminal (RF OUT) 114, a line video/audio input terminal (LINE V_IN, LINE A_IN) 115 and a line video/audio output terminal (LINE V_OUT, LINE A_OUT) 116, and a digital audio signal output terminal (SPDIF: serial parallel digital interface) 117.

The super video input terminal 111 is a terminal for receiving a digital-type, mutually separated brightness signal Y and color difference signals Cr and Cb. The super video input terminal 111 is connected to either a digital camcorder, a digital video disk (DVD) player or a set-top box.

The RF input terminal 113 is a terminal for receiving a sky-wave broadcasting signal and is generally connected with an antenna.

The line video/audio input terminal 115 is a terminal for receiving an analog signal where a brightness signal Y and a color signal are mixed. The line video/audio input terminal 115 is connected to either a camcorder, a DVD player, or a set-top box that supports an analog video signal output.

The digital audio output terminal 117 is a terminal for outputting a digital audio signal transmitted from a main controller 160. The tuner 121 controls a reception channel so that a broadcast signal received on the channel requested by the input/output controller 125, which is controlled by the main controller 160, can be received through the RF input terminal 113.

The switching part 123 controls the input/output terminals connected with the switching part 123 to be selectively connected to each other under control of the input/output controller 125. The video decoder 131 decodes and outputs a signal received through the super video input terminal 111 or the switching part 123 under control of the main controller 160.

An audio analog/digital (A/D) converter 133 converts an analog audio signal input by way of the switching part 123, into a digital signal, and outputs the converted digital signal to the MPEG encoder 141. The MPEG encoder 141 encodes an audio signal from the audio A/D converter 133 and a video signal from the video decoder 131 using a set compression format type and stores the data to be recorded in the HDD 151, which is a large capacity memory unit, under control of the main controller 160. The MPEG encoder 141 can perform an encoding according to an MPEG-2 compression method. The synchronous dynamic random access memory (SDRAM) 143 is adopted as a memory for use in an encoding process by the MPEG encoder 141.

A data moving path providing part 157 provides a moving path for data stored on the HDD 151 and/or a compact disk (CD) and/or a DVD inserted into a disk player 155. The data moving path providing part 157 provides a moving path for writing the data recorded on a CD and/or a DVD of the disk player 155 onto the HDD 151, or for writing the data recorded on the HDD 151 onto a CD and/or DVD in the disk player 155. Also, The data moving path providing part 157 provides a moving path for writing data encoded by the MPEG encoder 141 onto the HDD 151 under control of the main controller 160.

The disk player 155 is mounted inside of the A/V data recording/reproducing apparatus 100. A DVD player for loading a disk to play data recorded on a recording medium, such as a DVD and/or a CD, can be adopted for the disk player 155. The disk player 155 is connected to perform a recording/reproducing operation under control of the main controller 160.

A light receiving part 171 is provided as an interface unit to receive a user's operation signal transmitted from the remote controller 200, which is an external input unit. The light receiving part 171 then outputs the operation signal to the main controller 160. The main controller 160 processes the user's operation signal received from the light receiving part 171 and controls each element accordingly.

The main controller 160 can be implemented, according to an embodiment of the present invention, as a single-chip type integrated circuit (IC) into which a central processing unit (CPU) 161 and an MPEG decoder 163, for decoding a signal compressed by the MPEG method, are incorporated. Alternatively, the MPEG decoder 163 can be segregated as a separate IC and connected with the main controller 160 in another embodiment of the present invention.

A variety of programs associated with the functions performed by the main controller 160 can be stored in a flash memory 165. The flash memory 165 is comprised of a graphic user interface (GUI) storage part 165*a*, where a program for processing a menu guide list screen, which will be described later, is stored. The SDRAM 167 is a temporary storage device used by the main controller 160.

The audio D/A converter 135 converts a digital audio signal from the MPEG decoder 163 of the main controller 160 into an analog audio signal and outputs the converted analog audio signal to the switching part 123. The video encoder 137 encodes a video signal from the video decoder 131 or the MPEG decoder 163, and outputs the encoded video signal to the switching part 123.

The input/output controller 125 controls the tuner 121 and the switching block 123 under control of the main controller 160. In the A/V data recording/reproducing apparatus 100, the main controller 160 loads an operating program stored in the flash memory 165 upon start-up, and processes various supported functions in response to a signal received from the remote controller 200 via the light receiving part 171.

A method for controlling a file list by the main controller 160 according to key selection from the remote controller will now be described in greater detail in connection with processing a menu guide list screen.

First, the remote controller 200, which is an external input unit of the A/V data recording/reproducing apparatus 100 according to an embodiment of the present invention will be described using elements related to operation of a menu guide list screen with reference to FIG. 3.

Figure 3:
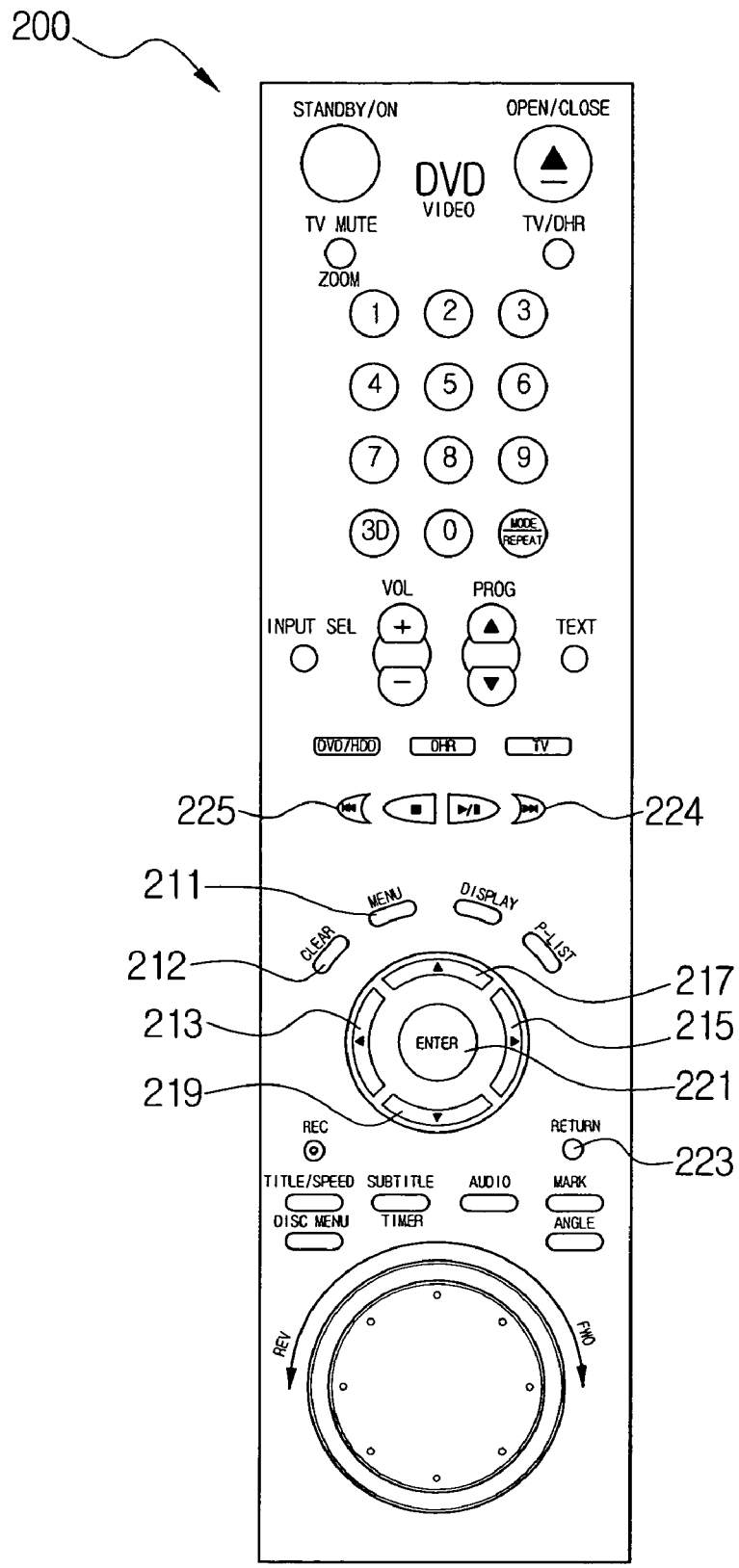
FIG. 3 is a plan view of a remote controller of FIG. 1.

In FIG. 3, menu key 211 is for use in instructing loading and closing of a menu guide list screen. Up and a down direction keys 217 (Δ) and 219 (∇) are for use in instructing up and down movements of a selection bar on a file or a folder display screen. Left and a right direction keys 213 (◁) and 215 (▷) are for use when moving to an uppermost file or folder, or a last file or folder on a file or a folder display screen. The fast forward (FF) key 224 and the rewind (REW) key 225 keys are for moving to a next page or a previous page on a file or folder display screen. The FF key 224 is also used as a down key for moving to a next page and the REW key 225 is also used as an up key for moving to a previous page. The enter key 221 is for use in selecting a menu, and the return key 223 is used to return to a previous screen from a current screen.

The other keys not described above are general keys for use in operating the A/V data recording/reproducing apparatus 100 and the television 300. Since their functions can be easily understood by the nomenclature displayed adjacent each key, a detailed description of each will be omitted.

A method for displaying a file or a folder on a screen of the television and easily displaying a list using a key of an input unit will now be described in greater detail.

Programs stored to the HDD 151 can be classified as A/V data, which can be divided into moving picture data, still image data, and audio data. Each data is recorded in the form of a computer file onto a physically subdivided region of the HDD 151. For example, still image data, such as a photo, is stored in a file format '*.jpg', and audio data, such as music, is stored in a file format '*.mp3'. These file formats and methods of storing or well known to those skilled in the art of the present invention.

For systematic management of the A/V data stored on the HDD 151, the HDD 151 has subdivided parent folder and a plurality of sub-folders included in the parent folder. Therefore, each data file can be stored and located on the subdivided parent folder or on one of the plurality of sub-folders of the parent folder on the HDD 151. Furthermore, data having various extensions such as 'jpg' or 'mp3' can be stored to the same predetermined sub-folder.

A menu guide list can be displayed on the television 300 to display a playlist screen for obtaining still image data and/or audio data information among the programs stored onto the HDD 151. Function control provided by the A/V data recording/reproducing apparatus 100 can be performed using the remote controller 200.

Figure 4:
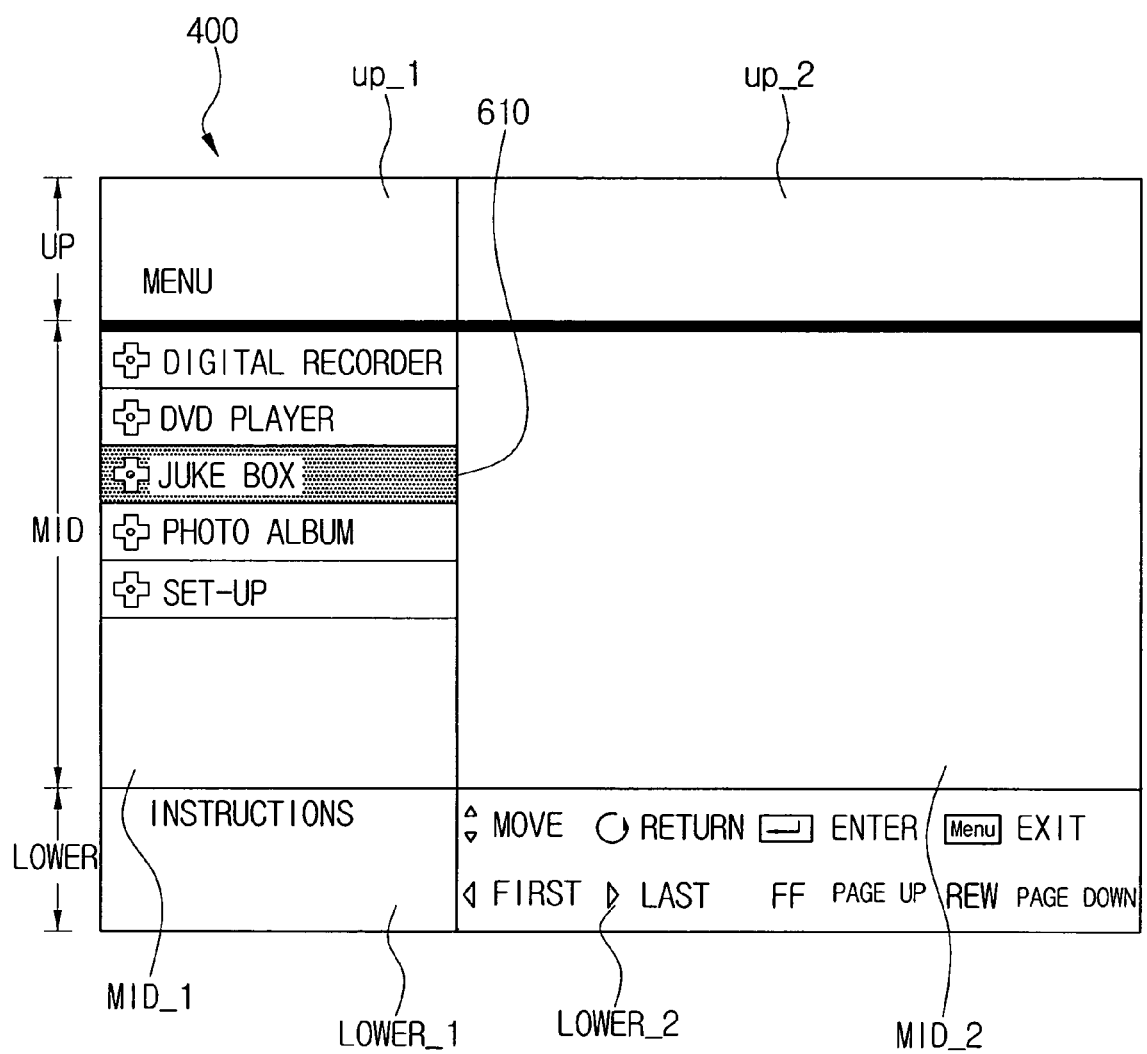
FIG. 4 is a view of a screen for an initial menu guide list displayed on a display apparatus when a menu key is selected on the remote controller of FIG. 3.

FIG. 4 is a view of an screen for an initial menu guide list displayed on a display apparatus when a menu key is selected on the remote controller of FIG. 3.

Referring to FIG. 4, if a signal that corresponds to the user selected menu key 211 of the remote controller 200 is received by the light receiving part 171, the main controller 160 provides an initial menu guide list screen 400 on the television 300 through an output terminal connected with the television 300. The output terminal can be the line video/audio output terminal 116. The main controller 160 provides the initial menu guide list screen 400 on the television 300 by executing a program stored in a GUI storage block 165a.

The initial menu guide list screen 400, and playlist screens 600 and 900, which will be described later, are screens in the form of a GUI. The initial menu guide list screen 400 is vertically divided into an upper region (up), a middle region (mid), and a lower region (lower), and each region is horizontally divided into a first block (up_1, mid_1, lower_1) and a second block (up_2, mid_2, lower_2).

A "MENU" representing the initial menu guide list screen 400 is displayed on the first block (up_1) of the upper region (up), and a main menu is displayed on the first block (mid_1) of the middle region (mid). Key operation usage information of the remote controller 200 that corresponds to use of the menu guide list screen 400 is displayed on the lower region (lower), second block (lower_2). Since the "FF/REW" keys displayed in FIG. 4 are function keys for moving up and down a page on the display screen, the "FF/REW" keys may not be displayed on a screen in the situation wherein only a single page is displayed lest a user becomes confused (for instance, if there is only one page, there is no need to move up and down the pages—thus, "FF/REW" keys are eliminated from the menu in that special circumstance). The path of the displayed file is sequentially displayed on the first and the second blocks (up_1 and up_2) of the upper region (up) so that a user can easily check the path of a selected file.

The main menu also comprises a "Digital Recorder" menu for managing data stored to the HDD 151, a "DVD Player" menu for controlling a program stored to the DVD player 155, a "Juke Box" menu for managing audio data among data stored to the HDD 151, a "Photo Album" menu for managing still image data among data stored to the HDD 151, and a "Set Up" menu for setting up the DVD player 155.

Figure 5:
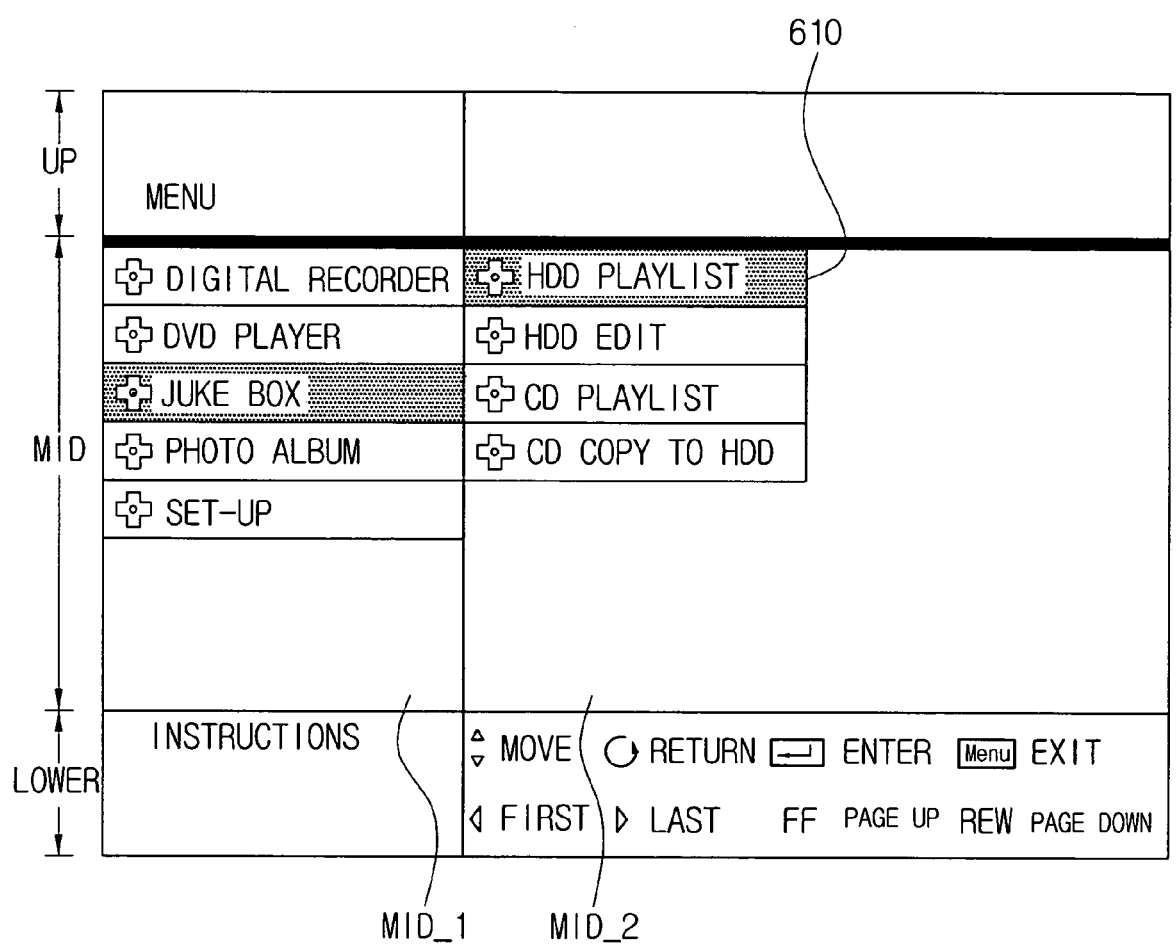
FIG. 5 is a view of a screen subsequently displayed when a juke box is selected among a menu guide list of FIG. 4.
Figure 6:
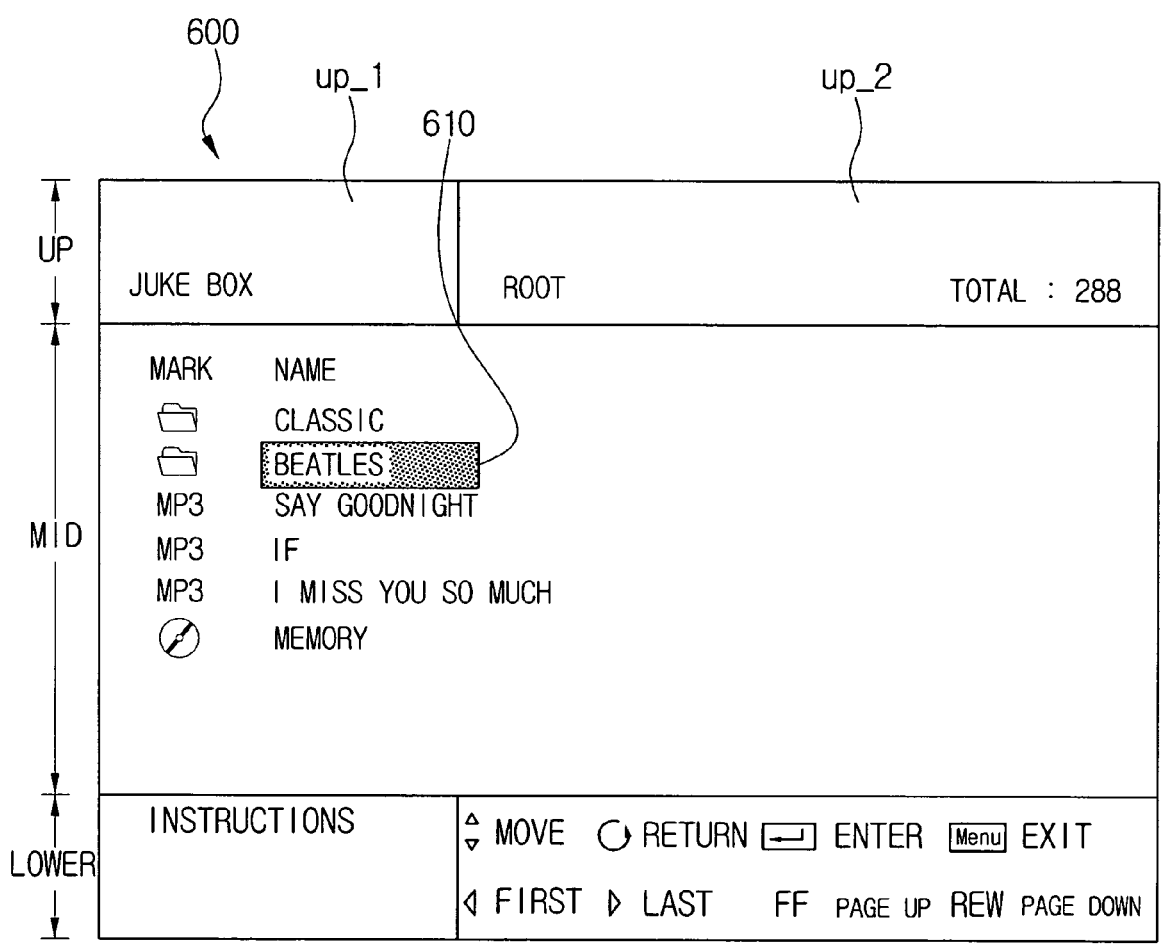
FIG. 6 is a view of a file list recorded on an HDD when an HDD playlist menu is selected on the screen illustrated in FIG. 5.

If a "Juke Box" menu is selected from the main menu on the initial menu guide list screen 400 by operating the direction keys 217 and 219 and the enter key 221 of the remote controller 200, a sub-menu included in the "Juke Box" menu is displayed on the second block (mid_2) of the middle region (mid) positioned on a right side of the main menu as shown in FIG. 5. If an "HDD Playlist" menu is selected in the sub-menu shown in FIG. 5 using the direction keys 217 and 219 and the enter key 221 of the remote controller 200, a playlist screen 600 that comprises the audio data files stored to the HDD 151 is displayed as shown in FIG. 6. The "HDD Playlist" menu shown in FIG. 6 is a menu for displaying a list of audio files stored to the HDD 151 in connection to execution of the "Juke Box"

Referring to FIG. 6, the "Juke Box" is displayed on a first block (up_1) in an upper region (up) of the playlist screen 600, and a "Root", which is a folder name of an uppermost folder of the HDD 151, is displayed on a second block (up_2). An execution screen of the "HDD Playlist" sub-menu selected from the "Juke Box" sub-menu is displayed on a middle region (mid) of the playlist screen 600. The execution screen is, in this case, a playlist for the "HDD playlist" menu of the "Juke Box".

Examination of FIG. 6 shows that the playlist related to execution of the "Juke Box" comprises two sub-folders ('Classic' and 'Beatles'), three mp3 files and one wave file. In this example, there are a total of 288 files related to execution of the "Juke Box" that are stored to the "Root" folder of the HDD 151. More specifically, it is shown that two sub-folders ('Classic' and 'Beatles'), three mp3 files and one wave file are stored.

Figure 7:
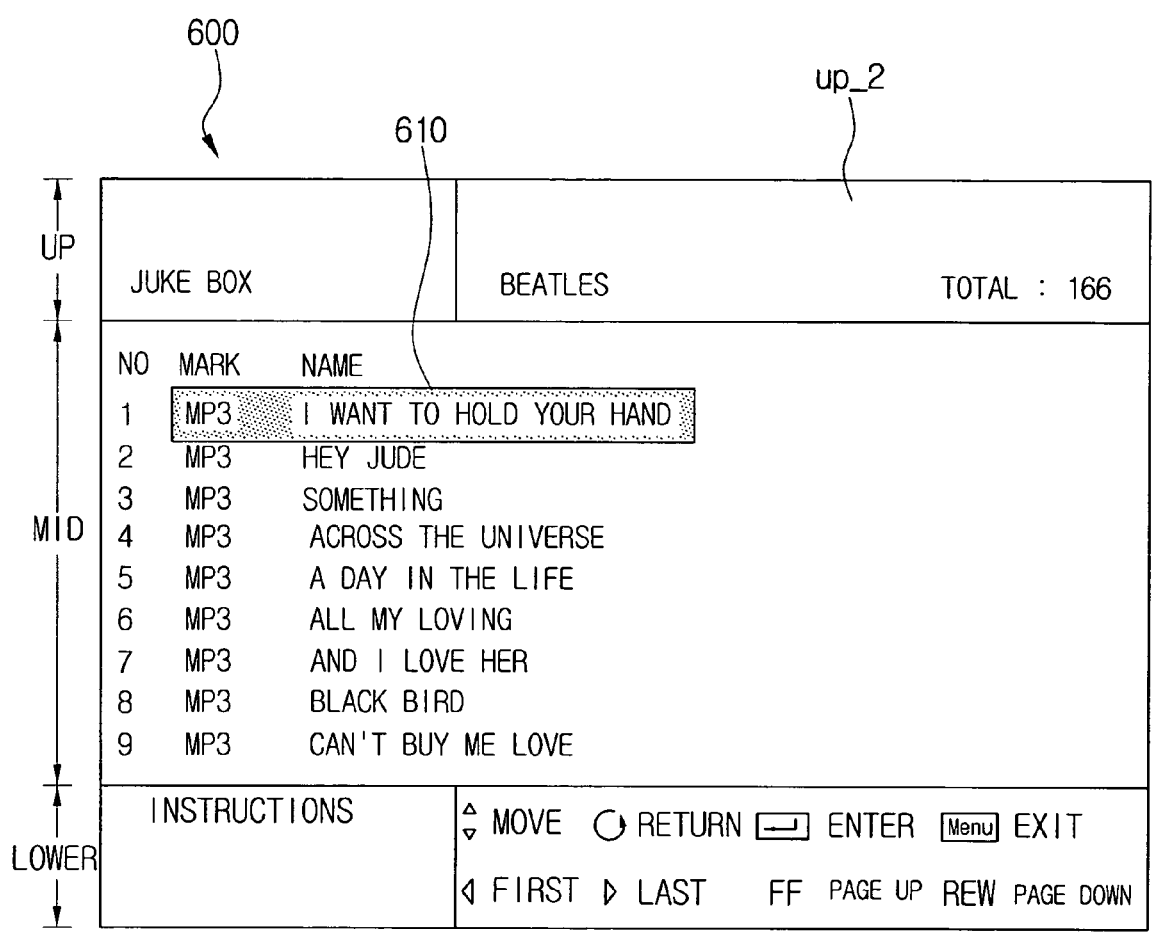
FIG. 7 is a view illustrating an audio file list in a sub-folder subsequently displayed when a sub-folder is selected on the file list illustrated in FIG. 6.

If a user selects a sub-folder titled "Beatles" from the playlist shown in FIG. 6 by moving a selection bar 610 using the direction keys 217 and 219 and the enter key 221 of the remote controller 200, files (for example, 'I want to hold your hand', 'Hey Jude', 'Something . . . ', among others) stored to the folder "Beatles", which is a sub-folder included in the "Root" folder, become listed as shown in FIG. 7. The selected sub-folder "Beatles", and a total number of files stored to the sub-folder "Beatles" are displayed in an upper region (up) of the playlist screen 600, instead of the name of the parent folder "Root". The display is in the form of "Beatles Total: 166" on a second block (up_2)".

Furthermore, if the sub-folder "Beatles" is selected, a first page of a file list stored in a folder is listed on a middle region of the playlist screen 600 first. The playlist screen 600 according to an embodiment of the present embodiment can list up to a maximum of nine files on one screen. In that case, if, for example, the entire number of files is 166, and grouping is sequentially performed in units of nine files, the files are grouped into nineteen pages and numbered accordingly. Four files are included in the last i.e., the nineteenth) page.

As shown in FIG. 7, if the "Beatles" folder is clicked (or selected), a page set as a default is displayed. Generally this is the first page among, in this case, the nineteen pages for which grouping has been performed for the files included in the folder. As shown in FIG. 7, information regarding nine files on the first page is listed. Though a file name, a file kind and a file number are displayed according to an embodiment of the present invention, file information regarding a representative screen, a storage date/time, or a length can also be displayed in the case of a moving picture file.

Figure 8:
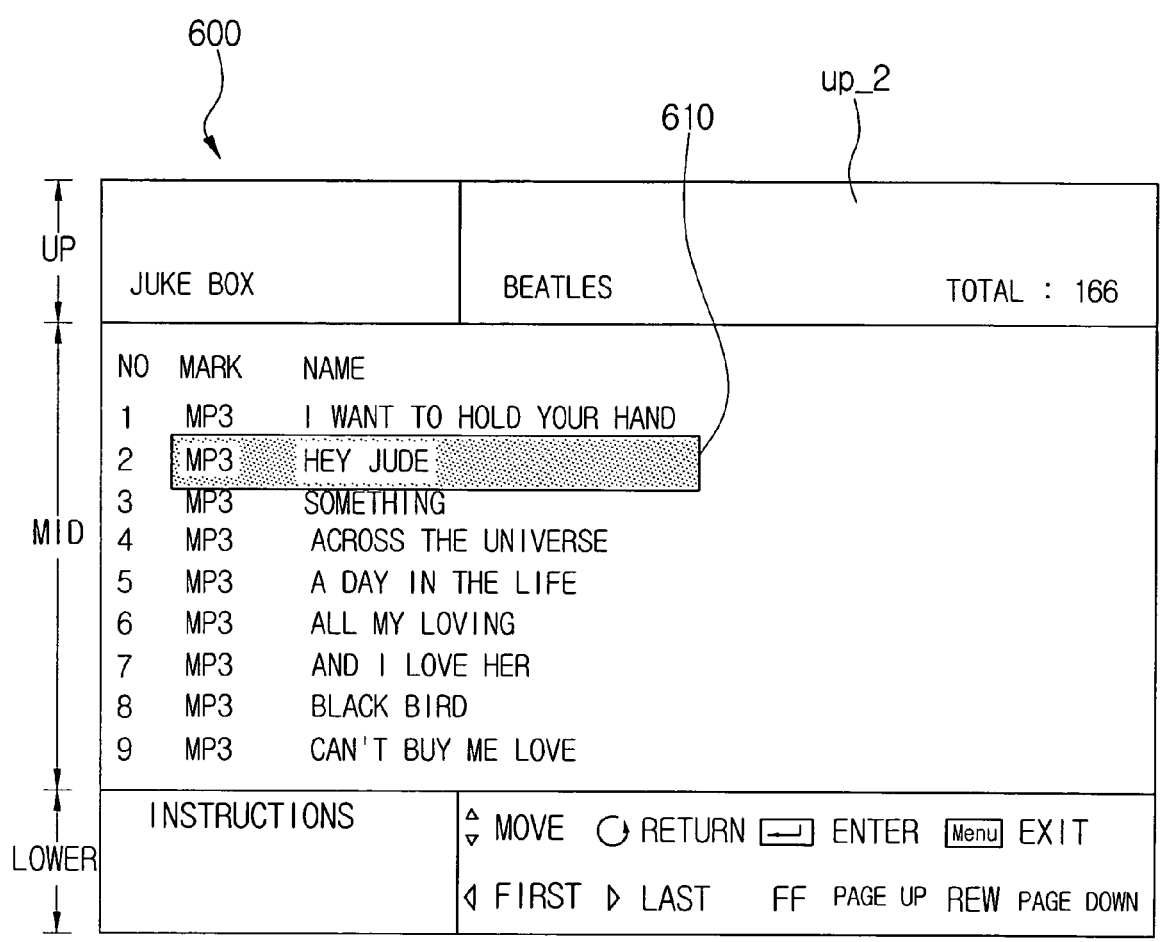
FIG. 8 is a view illustrating a file list to which a cursor has moved by operation of a remote controller in the file list illustrated in FIG. 7.
Figure 9:
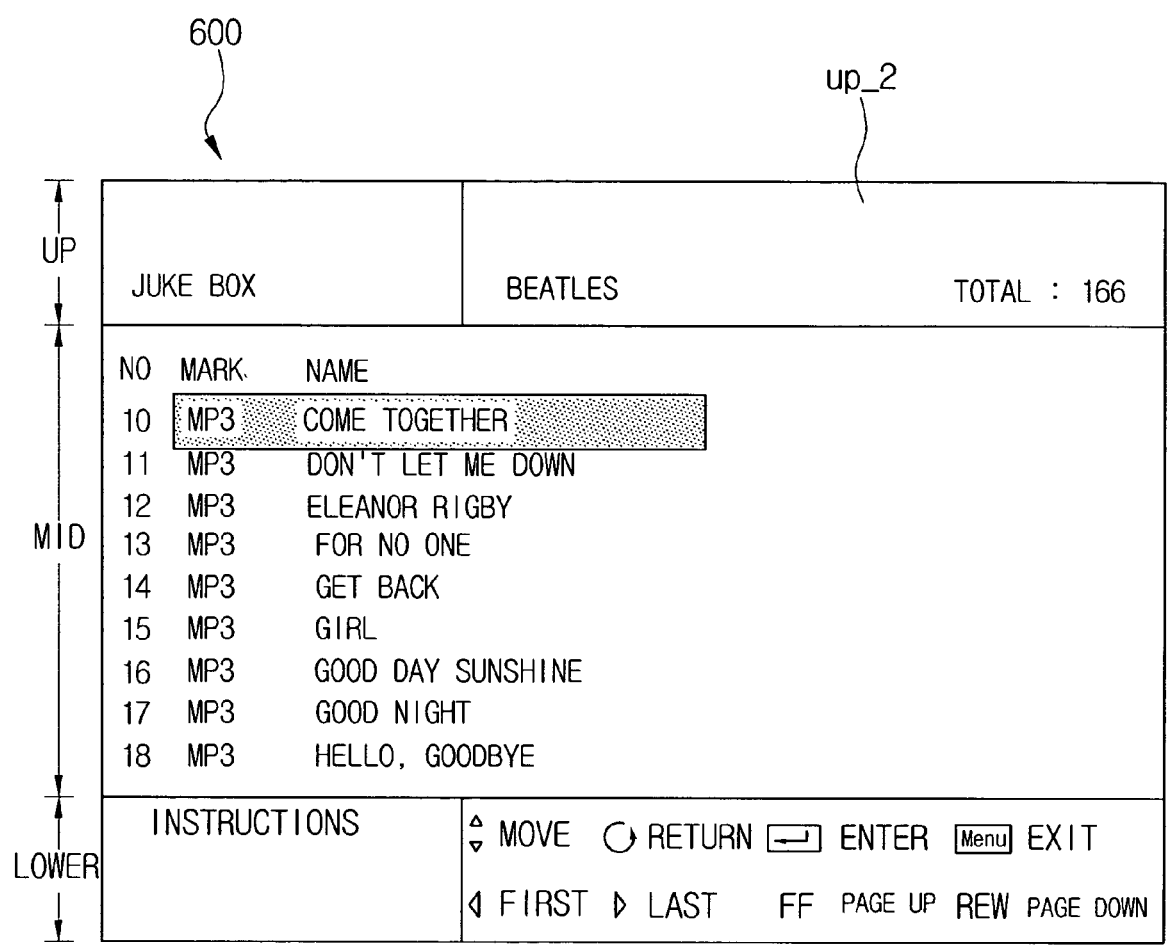
FIG. 9 is a view where a next page of a file list is displayed by operation of a remote controller in the file list illustrated in FIG. 7.

The user then selects the desired file by a selection bar 610 with reference to key operation usage information displayed on a screen (lower_2). The selection bar 610 is disposed on a default position at a first page. Generally, the selection bar 610 is disposed at the first file on the displayed list. For execution of a desired file, the selection bar 610 should be moved to the position of the desired file. The selection bar 610 moves up and down row-wise on the file list according to the operation of the up and the down direction keys 217 (Δ) and 219 (∇) of the remote controller 200. If, in the example shown in FIG. 7, the user inputs or selects the down direction key 219 (∇) of the remote controller 200, the selection bar 610 moves down one row at a time, as shown in FIG. 8. Since, in some circumstances (i.e., if there are a large number of files) it can take a great deal of time to reach a desired file according to the above-described file selection method, another embodiment of the present invention has provide a mechanism such that the selection bar 610 can move by page-by-page using the FF and a REW keys 224 225 on the remote controller. If a FF key signal is received from the remote controller 200 by the light receiving block 171, a file list of the next page is displayed as shown in FIG. 9. The selection bar 610 is generally disposed on the default position, but it is also possible to make the selection bar 610 positioned on a corresponding position of a following page. If a REW key signal is received from the remote controller 200 by the light receiving block 171 with the files shown in FIG. 10 (which are the last four files of the "Beatles" playlist, the selection bar 610 moves to the previous page as shown in FIG. 7. If a REW key signal is received from the remote controller 200 by the light receiving block 171 when the selection bar 610 is located at the first page shown in FIG. 7, a last page that, in this instance, includes four files, is displayed on the screen. If a user presses the FF key 224 four times in order to select the thirty eighth file among the one hundred sixty six files, a fourth page is displayed and then if the down direction key 219 (∇) is pressed two times at the fourth page, the selection bar 610 moves to thirty eighth file.

Figure 10:
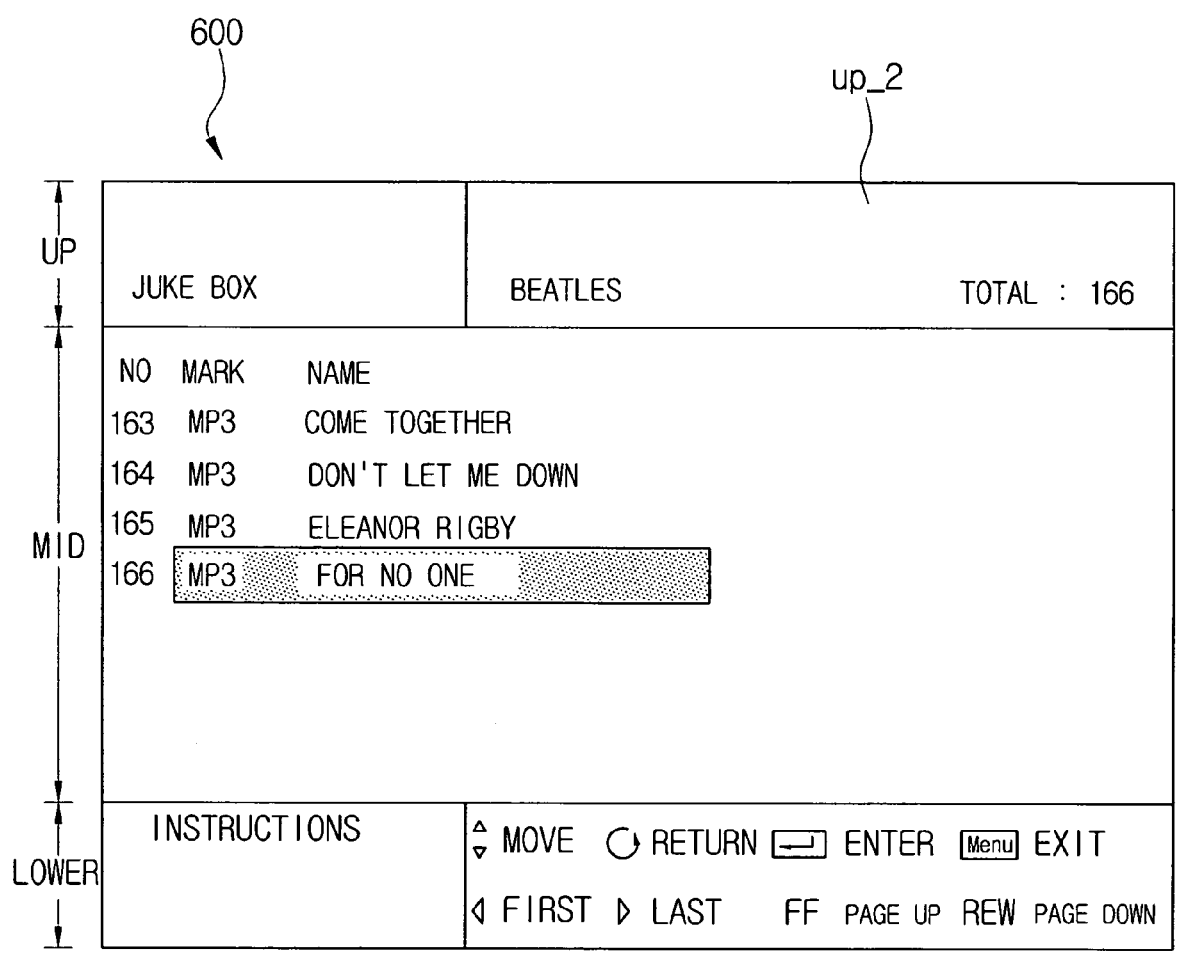
FIG. 10 is a view where a last page of the file list illustrated in FIG. 7 is displayed.

As shown in FIGS. 7 to 9, if a right direction key 215 (▷) is pressed with the selection key 610 positioned in an arbitrary position, the selection bar 610 is moved and positioned on a last file of the last page. Therefore, as shown in FIG. 10, the selection bar 610 is positioned on the one hundred sixty sixth file, which is the last file. Further, if a left direction key 213 (◁) is pressed with the selection bar 610 positioned in an arbitrary position, the selection bar 610 is moved and positioned on the first file of the first page. Regardless of where the selection bar 610 is located, when the left direction key 213 (◁) is pressed, the selection bar 610 becomes positioned on the first file as shown in FIG. 7.

Figure 11:
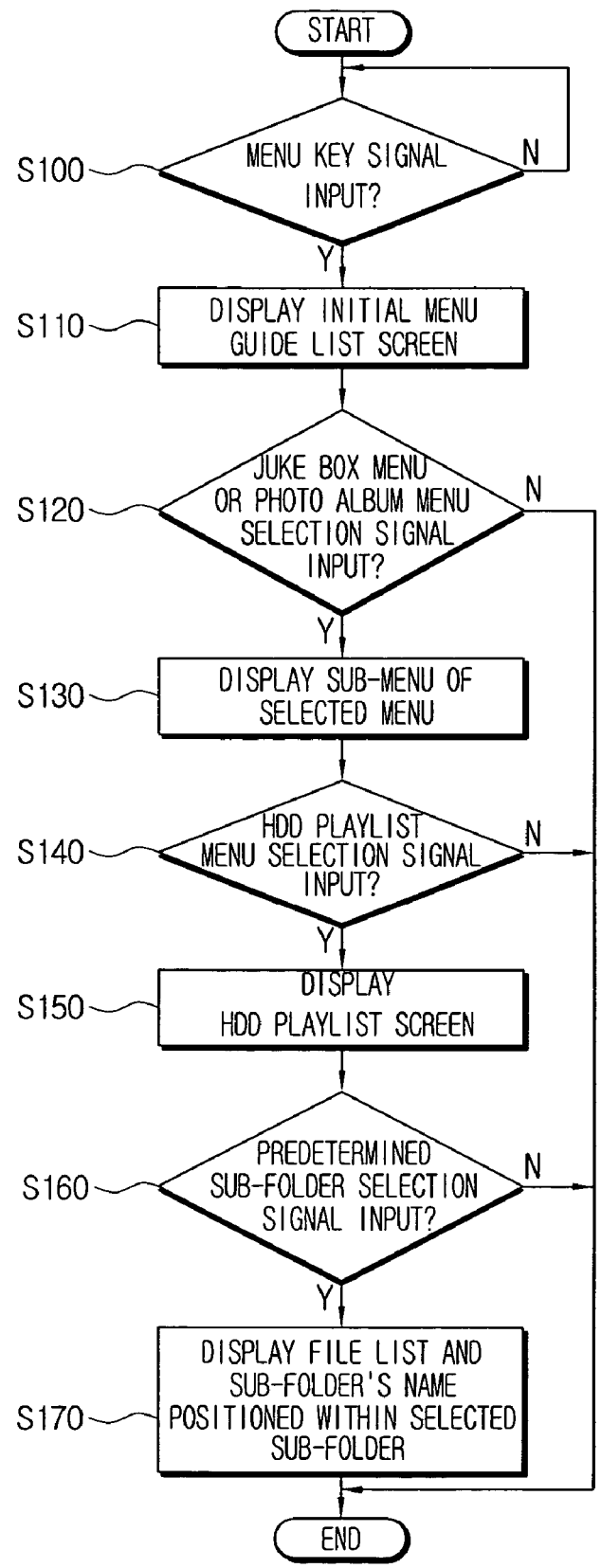
FIG. 11 is a flowchart illustrating a method for displaying a file list in an A/V recording/reproducing apparatus according to an embodiment of the present invention.
Figure 12:
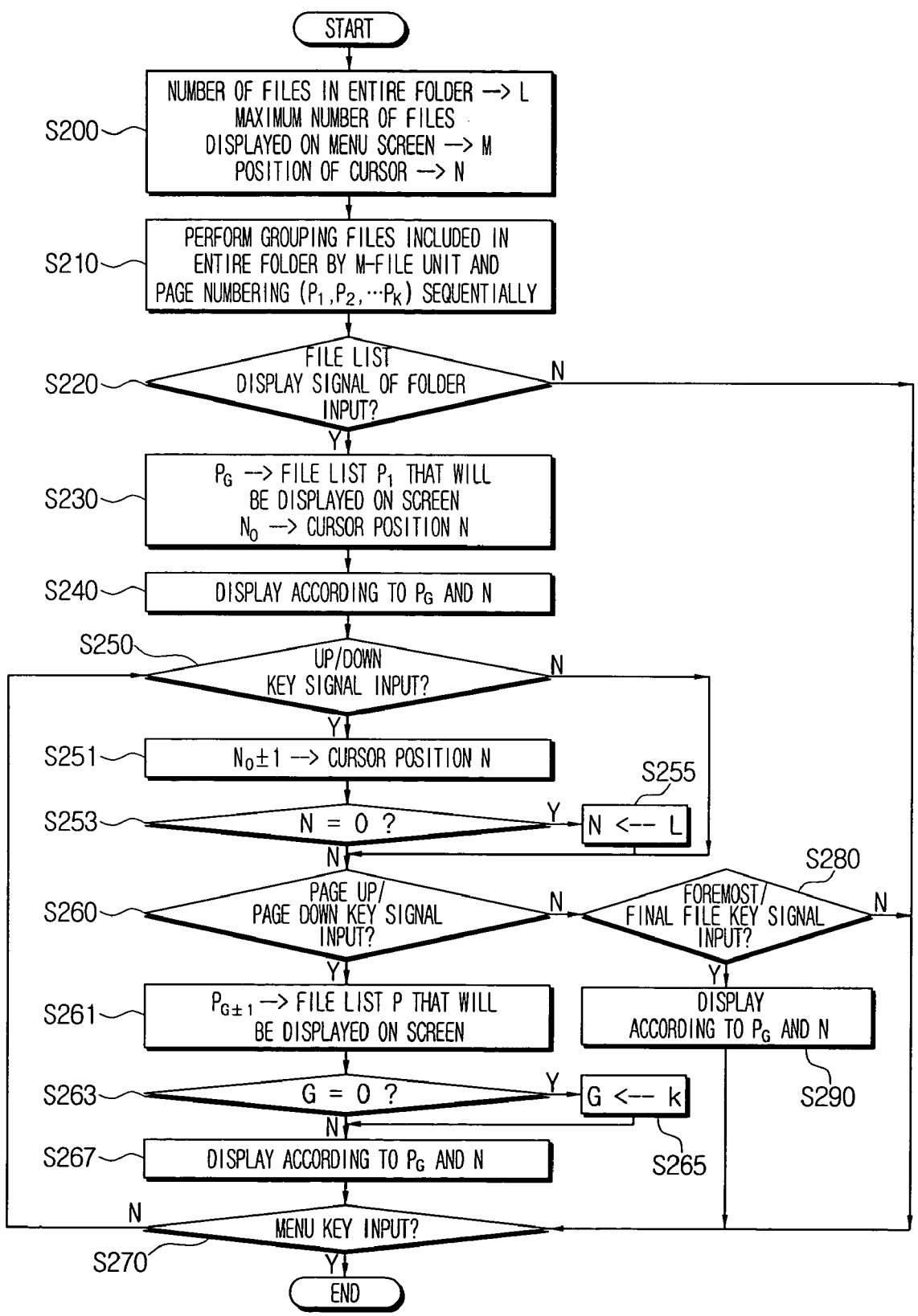
FIG. 12 is a flowchart illustrating a control procedure for selecting a file on a file list in an A/V recording/reproducing apparatus according to an embodiment of the present invention.

FIG. 11 is a flowchart illustrating a method for displaying a file list in an A/V recording/reproducing apparatus according to an embodiment of the present invention. FIG. 11 is a flowchart illustrating a control procedure of the method for displaying a file list in an A/V data recording/reproducing apparatus shown in FIG. 2, and FIG. 12 is a flowchart illustrating a control procedure for selecting a file on a file list displayed by the method for displaying a file list shown in FIG. 11.

Referring to FIG. 11, an "HDD Playlist" menu should be selected from the initial menu guide list screen in order to display playlist screens 600 and 900 regarding still image data and/or audio data stored to the HDD 151. For that purpose, the menu key 211 of the remote controller 200 is selected in decision step S100 ("Yes" path from decision step S100) so that the initial menu guide list screen 400 shown in FIG. 4 will be displayed on the television 300 instep S110.

Following step S110, if the selection bar 610 is positioned on the "Juke Box" menu using the up/down direction keys 217 and 219 and the enter key 221 of the remote controller 200 is pressed on the initial menu guide list screen 400 where the main menu is listed ("Yes" path from decision step 120), a menu on which the selection bar 610 is positioned is selected and displayed on the television 300 (step S130). If the "Juke Box" menu is selected at the step of S120, a sub-menu of the "Juke Box" menu is displayed on a second block (mid_2) of a middle region (mid) positioned on a right side of the main menu as shown in FIG. 5. In that case, the "Juke Box" can be displayed in a shadow so as to indicate that the "Juke Box" has been already selected.

If the selection bar 610 is moved to the "HDD Playlist" menu using the direction keys 217 and 219 and the enter key 221 of the remote controller 200, and the enter key 221 is pressed again after the step of S130, the "HDD Playlist" menu is selected ("Yes" path from decision step S140). If the "HDD Playlist" menu is selected at step S140, the main controller 160 changes the current screen and lists and displays a file playlist regarding audio data stored to the HDD 151, on the middle region (mid) as shown in FIG. 6 (step S150).

As a result of step S150, the "Juke Box" is displayed on the first block (up_1) of the upper region (up) of the playlist screen and the "Root", which is a name of an uppermost folder of the HDD 151, is displayed on the second block (up_2). Further, an execution screen of a sub-menu selected from the sub-menu of the "Juke Box" is displayed on the middle region (mid) of the playlist screen 600. Thus a playlist regarding the "HDD Playlist" menu of the "Juke Box" is displayed.

In the event that a sub-folder of the "Root" folder exists on the playlist, and if a predetermined sub-folder is selected by operating the up/down direction keys (Δ/∇) 217 and 219 and the enter key 221 is selected ("Yes" path from decision step S160), an audio file list and a sub-folder's name positioned within the selected sub-folder are displayed on a playlist screen 600 (step S170).

For example, if the sub-folder titled "Beatles" is selected from the playlist shown in FIG. 6, files stored in the folder "Beatles", which is a sub-folder included in the "Root" folder, are displayed on the middle region (mid) as shown in FIG. 7. Also, the "Beatles", which is a name of the selected sub-folder, is displayed instead of the "Root" which is a name of a parent folder, on the second block (up_2) of the upper region (up) of the playlist screen 600. Further, it is possible to display a number of files stored in the relevant folder in form of "Total: 166" on the second block (up_2) of the upper region (up).

FIG. 12 is a flowchart illustrating a control procedure for selecting a file on a file list in an A/V recording/reproducing apparatus according to an embodiment of the present invention. In step S200 a number (L) of files in the whole folder, a maximum number (m) of files displayed on the menu screen, and a position of the cursor (n) of the selection bar 610 are set. Following step S200, the entire files are sequentially grouped using the maximum number (m) of files and numbering is sequentially performed in the form of $P_1$, $P_2$, ... $P_k$ (step S210). For example, in case of the "Beatles" folder shown in FIG. 7, the number of entire files L is 166, and the maximum number of files m displayed on the menu screen is set to nine. Therefore, the total number of pages are nineteen and a last page includes four files. Files are sequentially grouped in page order as described above. If a file list display signal for a folder is received ("Yes" path from decision step S220), a file list for a $P_1$ page, which is the first page, is displayed (step S230). Thus, a file list including files whose file numbers are one through nine is displayed, and the selection bar 610 is positioned on the default position $n_0$ (S230, S240). In the embodiment of the present invention shown in FIG. 7, the default position of the selection bar 610 is the position of the first file on the list.

If the up/down direction key (217, 219) signals of the remote controller 200 are received with the file list displayed as described above ("Yes" path from decision step S250), the cursor moves from a default position to a position that has been moved up/down one row (step S251). If an up direction key signal is received with n=0, (i.e., the selection bar 610 is positioned on a position of a file number 1), the selection bar 610 moves to a position $n_L$ where the last file is positioned ("Yes" path from decision step S255) (See FIG. 10). If N does not equal 0 in decision step 253, the method proceeds to decision step 260. The cursor will then move up or down one corresponding to the key (up key 217 or down key 219) that was pressed. Following both steps 255 and a "No" decision from decision step S253, the method proceeds to decision step 260.

In decision step 260 the method determines whether a page up or page down key has been pressed. If a page up or a page down key represented by a FF or a REW key 224 or 225 of the remote controller is pressed ("Yes" path from decision step S260), a page displayed on a screen is moved to a next or a previous page (step 261). In the embodiment of the present invention, a FF key signal and a REW key signal are used for a page up signal and a page down signal, respectively. If the REW key 225 is pressed at the first page $P_1$, a page displayed is $P_0$(step S263) and the $P_0$ is set to a last page $P_k$(step S265). Accordingly, the last page ($P_k$) including file numbers 163, 164, 165 and 166 becomes a page $P_G$ that will be displayed(step S267). If an FF key 224 is pressed at $P_1$, the page that will be displayed is set to $P_2$ and, as shown in FIG. 9, a file list including file numbers from 10 to 18 will be displayed on a list screen. At this point, the selection bar 610 is positioned on a default position set to a position of a first file on the list as shown in FIG. 9. Further, if a menu key signal is received with a file list screen displayed(step S270), the file list display mode is terminated.

If the page up/page down keys are not pressed ("No" path from decision step 260), then the method proceeds to step S280. If a foremost file (the left direction key (◁)) 213 or a last file key (right direction key (▷)) 215 represented by the left or the right direction key is then pressed ("Yes" path from decision step 280) (i.e., if the left direction key (◁) 213 is pressed with a page or a file on which the selection bar 610 is positioned ignored), the selection bar 610 is moved to a first file of the first page (step S290). The selection bar 610 is moved to the first file as shown in FIG. 7 regardless of the position of the selection bar 610. On the contrary, if the right direction key (▷) 215 is pressed, the selection key 610 is moved to a last file on the last page (step S290).

Though description has been made mainly for audio files stored in the "Juke Box" according to the embodiments of the present invention, the embodiments of the present invention can be applied in the same way to moving picture files and still image files stored to the memory unit and/or a memory medium. Therefore, according to the file list management system and method of the embodiments of the present invention, it is possible to access a desired file among stored files more rapidly and check a file stored in a folder more easily.

Further, according to the embodiments of the present invention, it is possible to access a file in an easy and swift manner when listing, displaying, and selecting files stored in the memory unit of the A/V data recording/reproducing apparatus. Therefore, a user can make use of the A/V data recording/reproducing apparatus in a much easier manner.

Although certain embodiments of the present invention have been described, it will be understood by those skilled in the art that the present invention should not be limited to the above-described embodiments, but various changes and modifications can be made within the spirit and scope of the present invention as defined by the appended claims.

What is claimed is:

1. An A/V (audio/video) recording/reproducing apparatus for recording an externally received A/V signal in a memory unit, a still image file and/or an audio file being recorded in a parent folder and/or at least one sub-folder included in the parent folder of the memory unit, and for reproducing the recorded A/V signal and outputting the A/V signal to an external display unit, the A/V recording/reproducing apparatus comprising:
    an interface unit installed on a main body, for receiving a user's input signal from an external input unit with which functions supported by the A/V recording/reproducing apparatus can be selected; and
    a main controller for listing file information stored in the memory unit and/or the recording medium for each folder, performing a grouping, for each folder, with respect to all the files included in the folder, according to a maximum number of files that can be displayed on one screen, and displaying the information if a playlist screen display request signal regarding files stored in the memory unit and/or the recording medium is received from the external input unit.

2. The apparatus according to claim 1, further comprising: the main controller for sequentially performing a page numbering for each group, and for then displaying the files for each grouped page on a screen upon playlist display request.

3. The apparatus according to claim 2, wherein the main controller displays a previous/next page of a currently displayed page on a screen if a page up/down signal is received from the external input unit.

4. The apparatus according to claim 3, wherein the page up/down signal are generated by pressing an FF/REW(fast forward/rewind) key on the external input unit.

5. The apparatus according to claim 2, wherein the main controller selects and displays an uppermost file on a first page or a last file on a last page if an uppermost file or a last file selection signal is received from the external input unit.

6. The apparatus according to claim 5, wherein the uppermost file/last file selection signal are generated by pressing a LEFT/RIGHT key on the external input unit.

7. The apparatus according to claim 1, wherein a description for the keys of the external input unit is displayed on a lower end of a playlist screen so that a user can select and use a relevant key function.

8. The apparatus according to claim 1, wherein paths for the displayed files are sequentially displayed on an upper end of the playlist screen.

9. The apparatus according to claim 1, further comprising:
    a recording medium playback unit for reproducing an A/V file from a recording medium on which an A/V signal is recorded.

10. A method for displaying a file list in an A/V recording/reproducing apparatus for recording an externally received A/V signal in a memory unit, a moving picture file, a still image file and/or an audio file being recorded in a parent folder and/or at least one sub-folder included in the parent folder of the memory unit and/or a recording medium, and for reproducing the A/V signal recorded in the memory unit and/or the recording medium and outputting the A/V signal to an external display unit, the method comprising the steps of:
    performing a grouping, in units of a predetermined number of files, of entire files included in a folder that are stored in the recording medium and/or the memory unit;
    sequentially performing a page numbering for each group; and
    displaying the files on the display unit for each numbered page if a playlist display request signal for the files is received;
    wherein the grouping for entire files in the folder is performed in units of a maximum number of files that can be displayed on one screen.

11. The method according to claim 10, further comprising:
    displaying a previous or a next page of a currently displayed page on a screen if a page up or down signal is received with a playlist of the files displayed.

12. The method according to claim 10, further comprising:
- selecting an uppermost file on a first page or a last file on a last page and displaying the file on the display unit if an uppermost file or last file selection signal is received,.

13. The method according to claim 12, wherein the page up/down signal and the uppermost file/last file selection signal are generated by pressing an FF/REW(fast forward/rewind) key and a LEFT/RIGHT key.

14. The method according to claim 10, wherein a description for the keys is displayed on a lower end of a playlist screen so that a user can select and use a relevant key function.

15. The method according to claim 10, wherein paths for the displayed files are sequentially displayed on an upper end of the playlist screen.

\* \* \* \* \*